United States Patent [19]

Kuroki et al.

[11] Patent Number: 4,733,446
[45] Date of Patent: Mar. 29, 1988

[54] ROLL

[75] Inventors: Takanori Kuroki; Hironori Kuroki; Tsuguo Honda, all of Fukuoka, Japan

[73] Assignee: Kuroki Kogyosho Co., Ltd., Fukuoka, Japan

[21] Appl. No.: 389,748

[22] Filed: Jun. 18, 1982

[51] Int. Cl.$^4$ ............................................. B21B 27/02
[52] U.S. Cl. ..................................... 29/121.6; 29/132
[58] Field of Search ................. 29/121.6, 121.1, 121.5, 29/110, 132, 121.4; 219/119; 228/119, 158, 160, 162

[56] References Cited

U.S. PATENT DOCUMENTS

| | | | |
|---|---|---|---|
| 2,322,021 | 6/1943 | Hengstler | 228/162 X |
| 3,719,978 | 3/1973 | Clyne | 29/121.6 |
| 3,934,324 | 1/1976 | Hess et al. | 228/158 X |
| 4,047,274 | 9/1977 | Lehmann | 29/121.6 X |

Primary Examiner—Mark Rosenbaum
Attorney, Agent, or Firm—Jordan and Hamburg

[57] ABSTRACT

The surface of a roll has built-up weld layers which are arranged in bent waves such that the growth of initial fine cracks which occur on the surface of a roll are prevented. The surface of the built-up weld layer is finished smoothly so that the wavy weld beads prevent the growth of initial fine cracks.

8 Claims, 5 Drawing Figures

ROLL

BACKGROUND OF THE INVENTION

The present invention relates to a roll, especially a roll used under hot condition such as rolls for hot rolling or continuous casting.

Rolls for hot rolling or for continuous casting are used under conditions where metal pieces heated to 600° C.-1100° C. directly contact a roll surface repeatedly or, according to circumstances, the metal pieces temporarily stop at a roll. Accordingly, the surface layer of such a roll is radically heated and cooled and a large quantity of thermal stress occurs on the surface layer which results in plastic deformation of the surface layer. Also bending stresses occur by mechanical loads applied on the surface layer part of a roll. Cracks occur on such surface layer because of the thermal stress and the bending stress. Furthermore, such cracks grow into the inside of the roll, and in some cases the cracks cause breakdown of the roll.

The above mentioned conditions apply to a roll operating under hot conditions. When a roll operating under cold conditions, cracks are caused on the surface layer by a repetitive mechanical load, and further, the cracks grow into the inside of the roll so that it is considered that a roll operating under such cold conditions is the same as a roll operating under hot conditions. In an attempt to provide for such conditions, it has been considered to provide a built-up weld on the surface layer of a roll by using crack-resistant materials. However, even if such excellent materials were used on a roll, it is impossible to completely prevent crack initiation on the roll and their growth with the passing of time. Also, the method where a built-up weld is generally sets the weld beads in a spiral manner has the problem that cracks are caused along the weld beads and such cracks easily connect in a circumferential direction of the roll body.

SUMMARY OF THE INVENTION

Accordingly, it is an object of the present invention to improve a roll, not from a point of the quality of the materials, but from a point of the forming process of the built-up weld layer which is provided on the surface of a roll. The present invention relates to a roll for operating under hot conditions and for achieving the above-mentioned object. Each weld bead which composes the built-up weld layer presented to the surface of the roll extends in a direction on the circumference of a roll body with bent waves, and also the surface roughness of such built-up weld layer is less than 6.3S according to JIS (Japanese Industrial Standard) B 0659.

DETAILED DESCRIPTION OF THE PREFERRED EMBODIMENTS

Figure 1:
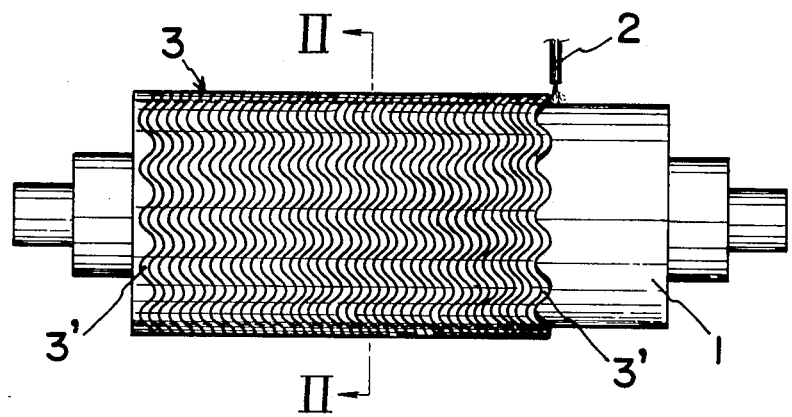
FIG. 1 is an elevational view showing a roll having a built-up weld layer deposited on the roll in accordance with one embodiment of the present invention.
Figure 2:
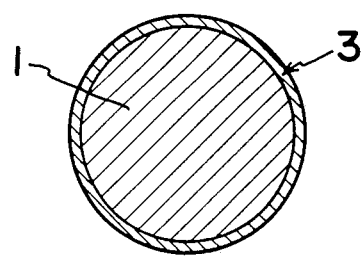
FIG. 2 is a cross-sectional view taken along the line II—II in FIG. 1.

A method for producing a roll of the present invention is set forth as follows. First of all, a welding torch 2 facing the surface of a roll body 1 is kept a certain distance from such surface, and a built-up weld layer 3 is formed by swinging relative movement, between the roll body 1 and/or the welding torch 2 to provide waves as shown in FIG. 1. The built-up weld layer 3 of required thickness provides an excellent crack resistant and wear resistant material. Each weld bead 3' which makes up the built-up weld layer 3 is in the form of a complete wavy pattern as shown in FIG. 3 or a wavy pattern as shown in FIGS. 4a and 4b.

Subsequently, the surface of the built-up weld layer 3 is finished to less than 6.3S in accordance with JIS B 0659, such surface being finished by grinding after a cutting process to make it smoother. The surface may be further finished by buffing after cutting, or a cutting and grinding process to make it much smoother, or after these three processes, the surface is lastly finished by rolling, that is, the surface of the built-up weld layer 3 is contacted directly and pushed by a small work roll having a surface which is flat and smooth. Both of them are rotated and a work hardening layer is formed on the surface of the built-up weld layer 3 with a mirror-like finish. Even in a roll of the present invention which is produced by the above-mentioned processes, the surface of the roll is subject to plastic deformation by radical heating and cooling in service and cracks occur in the roll. In the case where the surface of the roll is finished smoothly (less than 6.3S), the weakest part is at the point of the material along the weld beads which are the source of cracks and a plurality of initial fine cracks occur at the surface of the built-up weld layer on the roll body. Each initial fine crack is in the direction of the weld beads 3' with bent waves as shown in FIG. 3. If there are a lot of initial fine cracks having such directions, the stress existing around the surface is relaxed and removed, and the growth of cracks after that is loose. Also even if the number of cracks increases, it is impossible for them to be connected to become large sized cracks because the directions of the cracks are indefinite, and the cracks run into other cracks having their own direction which intersect after the cracks have grown to a certain extent.

The reason the surface of the built-up weld layer is finished to less than 6.3S smoothness in the present invention is as follows. In the case where the surface of the built-up weld layer is rougher than 6.3S, its rough-finish scratches become the source of initial fine cracks and it is impossible to expect the aforementioned effect in which the weld beads composing the built-up weld layer are bent in waves. Additionally, at the time of finishing the surface of the built-up weld layer by cutting, grinding and buffing, it is further effective to present the finishing direction to the axis of a roll or diagonally to the axis without coinciding with the circumferential direction of the roll body. Also in a roll in which the surface is finished by rolling, its surface is finished to a mirror-like condition which increases the effect of the wavy-bent weld beads. The desired working surface is further obtained by the work hardening of the rolling operation; therefore, there are the advantages that initial fine cracks are hardly caused and extended because of the strengthening of the worked surface layer.

Figure 3:
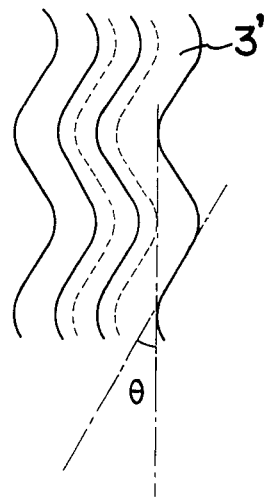
FIG. 3 is an enlarged detail view of the wavy pattern of the built-up weld layer.
Figures 4A, 4B:
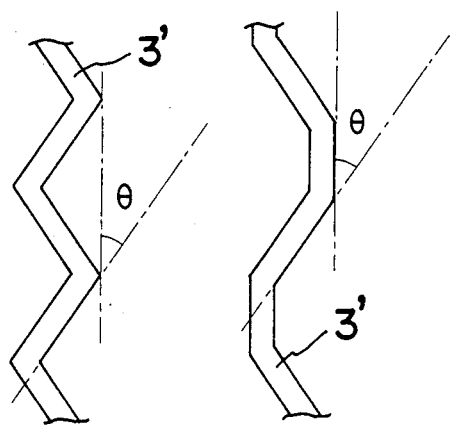
FIGS. 4a and 4b show enlarged detail views of other wavy patterns of the built-up weld layer.

As regards the angle of the wavy weld beads, it is desirable that the angle of the weld beads, that is, angle $\theta$ which is shown in FIG. 3 and FIG. 4 is $5° \leq \theta \leq 45°$. If the angle $\theta$ is less than 5°, the foregoing effect of the wavy bent beads is not enough, and the cracks connect in a direction along the circumference of the roll body. If the angle $\theta$ is more than 45°, initial fine cracks along the weld beads are hardly caused, and initial fine cracks occur at irrelevant parts with regard to the weld beads. According to the present invention as above mentioned, the surface cracks which occur in service run along the wavy weld beads. This relaxes the internal stress near the surface part of the roll, and it becomes possible to relax subsequent growth of the cracks. Most of the cracks have a considerable angle to the circumference of the roll body, such cracks hardly growing, and any cracks along the circumferential direction of the roll body also hardly grow because the cracks are along the weld beads. Also it is impossible for the cracks to be connected to form large sized cracks on the whole even if each crack has grown to a certain extent because of the indefinite directions of the cracks. Accordingly, there is achieved improvement of roll like and safety of operation.

What we claim is:

1. A roll for rolling heated metal comprising a roll body, a built-up weld layer on said body, said built-up weld layer comprising a plurality of circumferential weld beads on the surface of said roll body, each of said weld beads having a wave-like configuration and each extending in a circumferentially closed ring about said roll body, each of said weld beads being contiguous and in contact with an adjacent weld bead to form a continuous built-up weld layer on said roll body, said built-up weld layer having a smooth mirror-like surface.

2. A roll according to claim 1, wherein said weld beads have a wave angle within a range of from 5 to 45 degrees, said wave angle being measured relative to circumferential lines included in planes disposed perpendicular to the axis of said roll body.

3. A roll according to claim 1, wherein the surface of said built-up layer has a smooth surface of less than 6.3S.

4. A roll according to claim 1, wherein each of said weld beads extends sinuously around the circumference of said roll body.

5. A roll according to claim 1, wherein the surface of the built-up weld layer is a ground surface obtained by grinding.

6. A roll according to claim 1, wherein the surface of the built-up weld layer is a buffed surface obtained by buffing.

7. A roll according to claim 1, wherein the surface of of the built-up weld layer is a cut surface obtained by cutting.

8. A roll according to claim 1, wherein the surface of the built-up weld layer is a rolled surface obtained by rolling against another roller.

* * * * *